United States Patent [19]
Zuhlke et al.

[11] 4,171,735
[45] Oct. 23, 1979

[54] SAFETY DEVICE FOR A PRESS, A STAMPING MACHINE, OR THE LIKE

[75] Inventors: Jochen Zuhlke, Gevelsberg; Hans J. Mesek, Hagen, both of Fed. Rep. of Germany

[73] Assignee: Rolf Peddinghaus, Ennepetal, Fed. Rep. of Germany

[21] Appl. No.: 840,789

[22] Filed: Oct. 11, 1977

[30] Foreign Application Priority Data

Oct. 15, 1976 [DE] Fed. Rep. of Germany ....... 2646645

[51] Int. Cl.² .............................................. F16P 3/08
[52] U.S. Cl. ..................................... 192/134; 83/399; 100/53
[58] Field of Search ....................... 192/133, 134, 135; 100/53; 83/399

[56] References Cited

U.S. PATENT DOCUMENTS 2,236,730  4/1941  MacBlane ............................ 192/134
4,039,060  8/1977  Williams ............................. 192/134
4,060,160  11/1977 Lieber .................................. 100/53

Primary Examiner—Allan D. Herrmann
Attorney, Agent, or Firm—Dressler, Goldsmith, Clement, Gordon & Shore, Ltd.

[57] ABSTRACT

A safety device for a press and the like machinery includes a safety deflector surrounding a tool carriage reciprocable along a path with respect to a fixed frame. The safety device also includes a limit switch associated with a door that defines part of the safety deflector. First and second contactless switches are located adjacent a work supporting surface and respectively sense the position of opposite surfaces of the workpiece to insure that the workpiece is within limits of the work supporting surface and the safety deflector. The switches are in a circuit leading to a machine clutch for the tool carriage to prevent operation when the door is open or either surface of the workpiece is outside prescribed limits of the deflector and the support surface.

5 Claims, 3 Drawing Figures

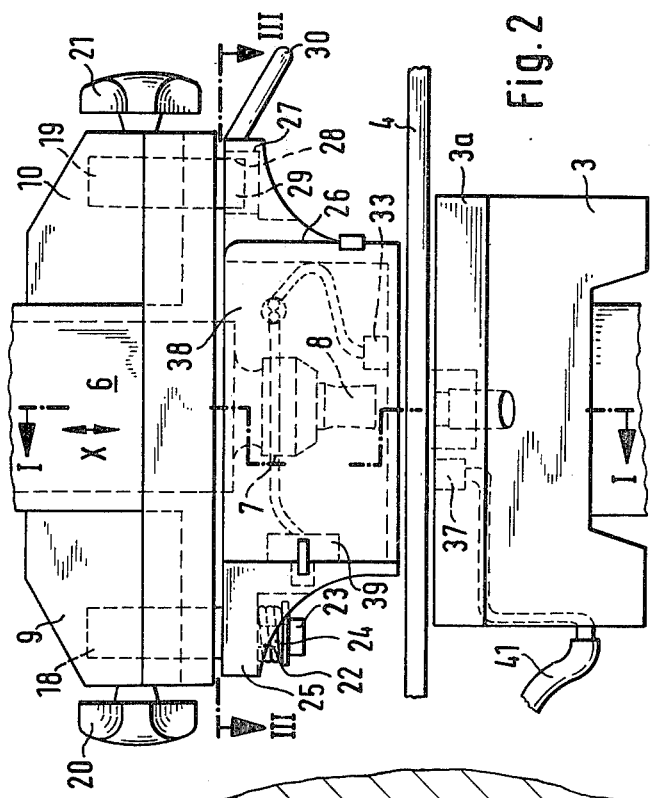
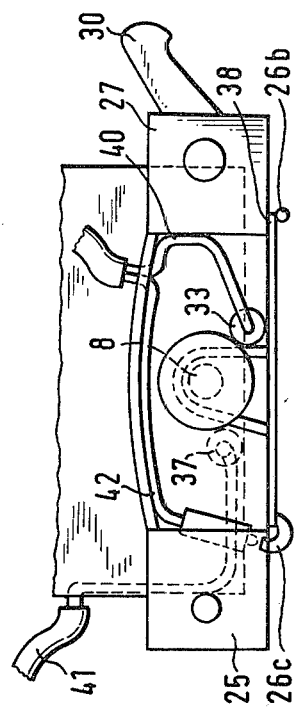
Fig. 2
Fig. 3
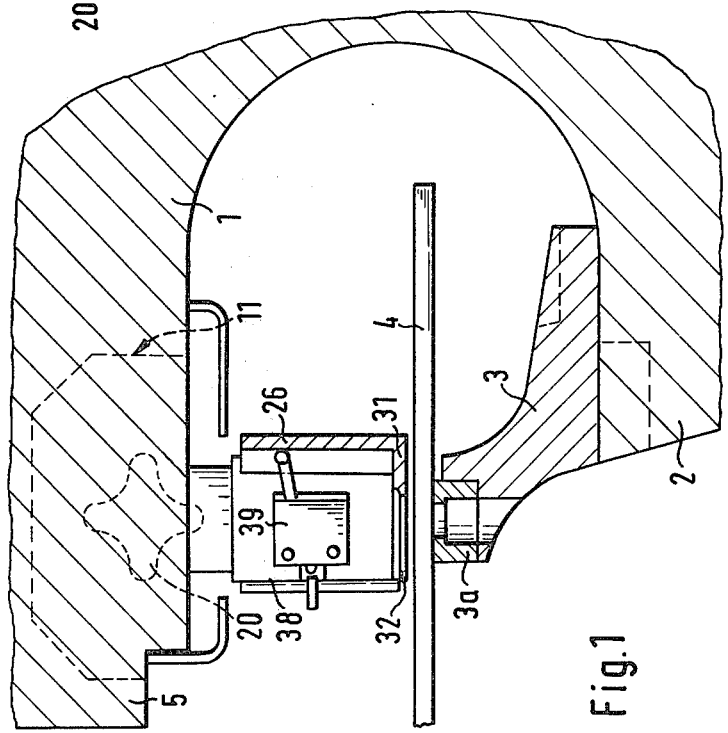
Fig. 1

SAFETY DEVICE FOR A PRESS, A STAMPING MACHINE, OR THE LIKE

The invention relates to a safety device for a press, a stamping machine, or the like, with a tool carriage having an elevating motion, guided in a machine frame, and a safety deflector which is fastened on both sides of the carriage guide in the machine frame and can be adjusted in height, and spans the travel of the tool carriage in the manner of a bridge and is provided with an opening for the tool.

A safety device of the abovementioned known type is known from German Utility Model 7,425,321.

The object of the invention is to improve the safety device to such effect that automatic accident prevention, which is as far as possible complete, is ensured for the person operating the machine tool.

The object of the invention is achieved when (a) the safety deflector surrounds the tool in the manner of a box and has an opening on the operating side, which can be covered by a transparent safety screen which on its part, when in the open position, actuates a limit switch attached to the safety deflector, and (b) a contactless switch is located in both the deflector bridge and the workpiece support parallel to it, which switches only respond, when the clear distance from the opposite sides of the workpiece is less than a certain value, in such a manner that the machine clutch can be engaged only after the limit switch is opened and the two contactless switches respond.

Whilst, as a result of the boxlike construction of the safety deflector, the tool is also protected on the operating side with the aid of the safety screen, extensive accident prevention is achieved since the machine only operates when the limit switch, in the position of the safety screen, which closes the access opening of the safety deflector, is open and the two contactless switches have approached the workpiece closer than a small air gap and have responded.

The invention is illustrated by way of example and schematically in the drawing. In the figures:

FIG. 1 shows a vertical, longitudinal section, along section line I—I in FIG. 2, through a safety device, partially cut away, FIG. 2 shows a front view of the safety device in FIG. 1 in a partially cut-away representation and FIG. 3 shows a horizontal section according to line III—III in FIG. 2.

In the Figures a safety device is illustrated which in the present example is located on a punching machine, the C-shaped machine-frame 1 of which has a lower limb 2 with a workpiece support 3 located over it, which support is constructed as a matrix holder, and a die 3a arranged therein, and the workpiece 4 rests on the workpiece support. The workpiece consists of metallic material and has two upper and lower sides which are opposite and essentially parallel to each other. The machine frame has furthermore an upper limb 5 in which a tool carriage 6 is guided vertically and which can be coupled via a clutch to the machine drive in a manner which is in itself known and which therefore is not shown. At its lower end the tool carriage carries a chuck 7 with a tool 8 clamped therein.

The chuck 7 with the tool 8 project into a box-shaped safety deflector 26 which is only open towards the operating side and is provided on the face sides with two brackets 25, 27 in about the same plane. The brackets 25 and 27 are connected to slide-pieces 18, 19 which can each be positioned at various heights in a recess 11 in the side parts 9, 10 of the machine frame, parallel to the direction of movement of the tool carriage 6, by means of knurled knobs 20, 21 via eccentric cams, which are not represented, as is described in detail in German Utility Model 7,425,321. The bracket 25 rests on the slide piece 18 under the pretension of a spiral compression spring 24 which with the one end bears against the bracket 25 and with the other end against a bolt head 23 and surrounds the bolt shank 22. On the other hand the bracket 27 is provided with a bore 28 into which a cam 29 engages, which cam is connected to the other slide piece 19. A hand lever 30 projects outwards from the bracket 27 by means of which hand lever the safety deflector can be pivoted about the bolt shank 22 in the direction parallel to the direction of movement of the tool carriage 6, which is vertical in the present example, and consequently can be disengaged from the cam 29, whereupon the deflector can be pivoted about the bolt shank 22 to the rear, in a plane which is approximately horizontal or transverse to the direction of movement of the tool carriage 6, when the chuck 7 and the tool 8 are to be released or made accessible.

The box-shaped safety deflector is provided with a deflector bridge 31 which is aligned at a distance below the tool 8, which in FIG. 2 is in its rest position, perpendicular to the direction of movement of the latter in accordance with arrow X, and is provided with an opening 32 which is open on the operating side, and the clear width of which is matched to the cross-sectional dimensions of the tools to be used with the machine, so that the tool can execute its working stroke through the opening, in the direction of the workpiece 4.

A contactless switch 33 is located in the immediate vicinity of this opening 32, which switch is mounted in the deflector bridge so that it is adjustable in height and can respond to the metallic workpiece 4 at the moment when the upper side of the workpiece 4 is less than a defined adjustable distance of a few millimeters away. The switch 33 is supplied with current by means of a line 40 and is, for example, connected to a counting-pulse switch which, depending on a certain number of pulses, closes the drive coupling for the machine.

A further contactless switch 37 is provided in the vicinity of the lower die 3a in the workpiece support 3, and this contactless switch responds to the workpiece 4 at the moment when the under side of the workpiece 4 forms just a small, likewise adjustable gap, with the switch. The switch 37 is likewise connected via a line 41 for example to a counting-pulse switch to trip-out the coupling of the machine.

The opening, of the box-like safety deflector, located on the operating side can be closed by a transparent safety screen 38 which is hinged at 26b by means of two hinges on the box-shaped safety deflector and is held in the closed position by a spring catch 26c. In the closed position a limit switch 39 is opened by the safety screen 38 which limit switch is attached inside the safety deflector and is connected by means of a line 42 likewise for example via a counting-pulse switch to the machine coupling. The arrangement is moreover so made that the drive coupling for the tool carriage 6 is only actuated for closing when the limit switch 39 has been opened by the closed safety screen 38 and the two contactless switches 33 and 37 have responded after the air gap, which is formed by these switches together with the particular sides of the workpiece 4 opposite to them, has been reduced to less than a defined set value. In this case the distance from the workpiece to the two switches can be very small and for example amount to only 2 mm, so that the total air gap in the present illustrative embodiment must be less than 4 mm. By appropriate adjustment of the height of the contactless switches this air gap can be altered according to the operating conditions.

The safety screen consists appropriately of transparent, high-impact acrylic glass.

The electrical control of the magnetic coupling of the machine, by means of the three switches described, can be arranged in any desired known manner and is not the subject of the invention.

We claim:

1. A safety device for a press and like machinery having a tool carriage reciprocable along a path with respect to a fixed frame having a workpiece support, a box-like safety deflector surrounding said tool carriage and adjustably supported on said frame along said path, said safety deflector including a bridge portion extending across said path and having an opening through which a tool supported by said tool carriage can project, said safety deflector having a door movable between open and closed positions to gain access to said tool carriage, a limit switch for indicating the position of said door, a first contactless switch carried by said bridge portion and operable when a first workpiece surface is within distance limits of said bridge portion, a second contactless switch adjacent said workpiece support and operable when a second workpiece surface is within distance limits thereof, said limit switch and contactless switches being in a circuit to a machine clutch operating said tool carriage to prevent engaging said clutch when said door is open and when either workpiece surface outside said distance limits from the respective contactless switches.

2. A safety device as defined in claim 1, in which at least one of said contactless switches is adjustable to vary said distance limits.

3. A safety device as defined in claim 2, in which said door is a transparent safety screen.

4. A safety device as defined in claim 3, in which said door is formed from an acrylic glass.

5. A safety device as defined in claim 2, in which both of said contactless switches are adjustable to vary both distance limits.

* * * * *